REUSABLE HOSE END FITTING FOR PLURAL LAYER HOSE
Original Filed Oct. 4, 1956 2 Sheets-Sheet 1
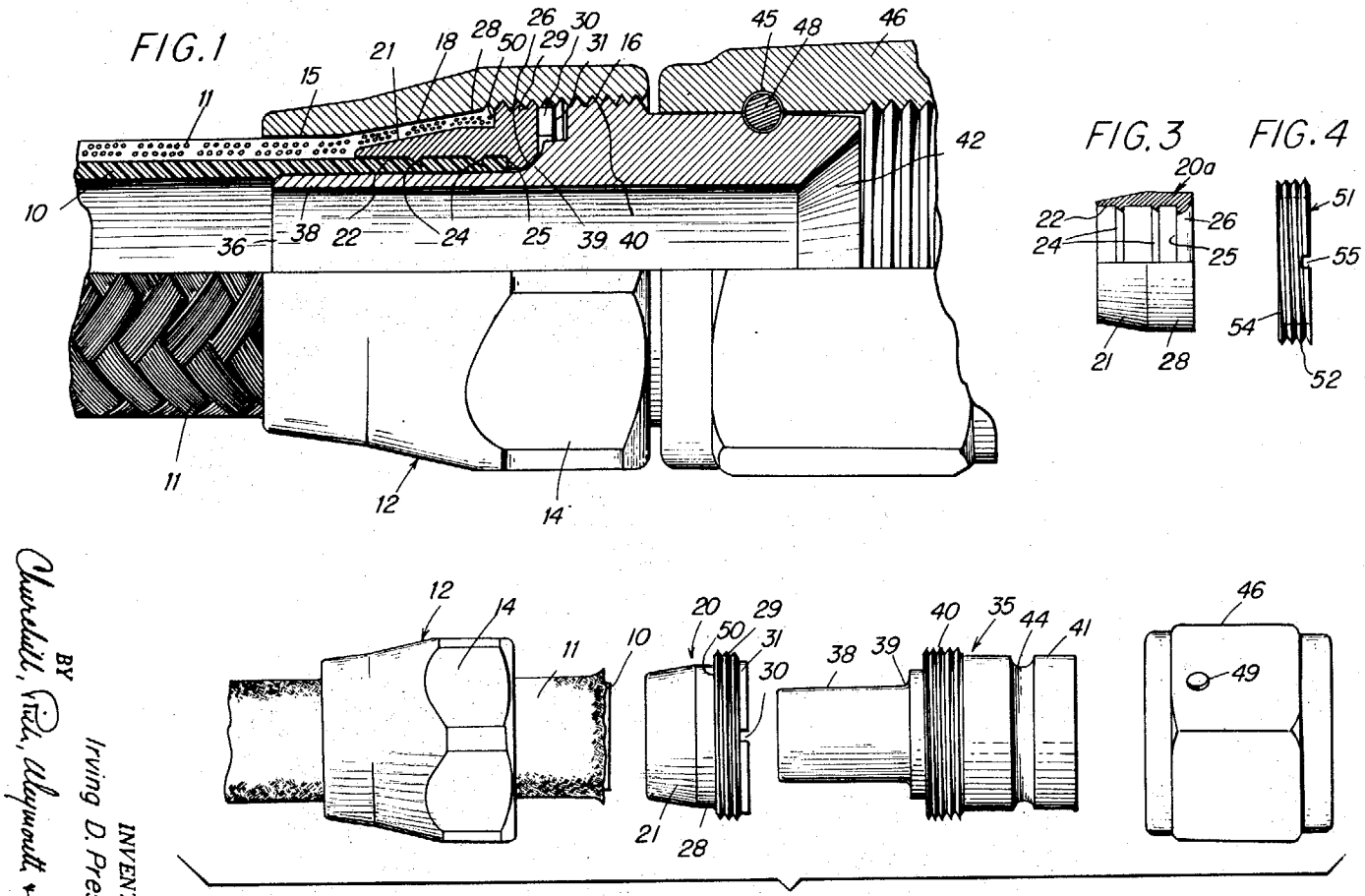
INVENTOR.
Irving D. Press
BY
Churchill, Pitch, Weymouth & Engel
Attorneys

REUSABLE HOSE END FITTING FOR PLURAL LAYER HOSE

Original Filed Oct. 4, 1956 2 Sheets-Sheet 2

INVENTOR.
Irving D. Press
BY
Churchill, Rich, Weymouth & Engel

United States Patent Office

Re. 24,786
Reissued Feb. 16, 1960

24,786

REUSABLE HOSE END FITTING FOR PLURAL LAYER HOSE

Irving D. Press, West Orange, N.J., assignor to Resistoflex Corporation, Roseland, N.J., a corporation of New York Original No. 2,853,319, dated September 23, 1958, Serial No. 613,870, October 4, 1956. Application for reissue September 14, 1959, Serial No. 840,222

6 Claims. (Cl. 285—39)

Matter enclosed in heavy brackets [ ] appears in the original patent but forms no part of this reissue specification; matter printed in italics indicates the additions made by reissue.

This invention relates to end fittings for flexible hose, more particularly fittings of the detachable, reusable type for use on hose having a tube or liner and a protective covering of reinforcing material thereon, for example wire braid.

The invention resides in improvements on a fitting designed by others which is subject to certain disadvantages and its principal objects are to make the fitting more secure against blow-off and to assure that the fitting is always properly attached. By blow-off is meant the separation of the hose from the fitting under internal pressure which, of course, is a much more serious failure than a mere leak.

The basic design and the nature of the improvements thereon will appear from the following description taken in conjunction with the drawings, in which:

Fig. 1 is a longitudinal half-section of a hose end with the improved fitting attached;

Fig. 2 is an exploded view on a reduced scale of the parts of the novel fitting which are shown with an end section of hose;

Fig. 3 is a half-section of another form of sleeve which may be used;

Fig. 4 is an elevation of a threaded washer for use with the sleeve of Fig. 3;

Figure 5:
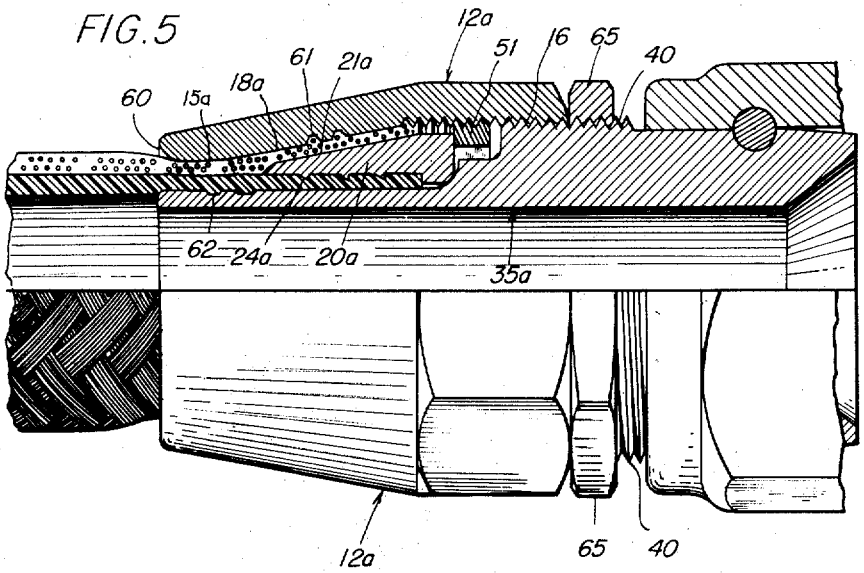
Fig. 5 is a view similar to Fig. 1 showing further features of the invention and certain modifications of the structure of Fig. 1, with utilization of the parts shown in Figs. 3 and 4.

The fitting illustrated is designed particularly for use on hose having a tube 10 of polytetrafluoroethylene ("Teflon") or like material and an outer covering of wire braid 11, the latter being shown in section somewhat schematically. A single layer of braid is shown but two or more may be employed for greater strength.

Referring to Figs. 1 and 2, the socket, generally designated 12, is externally provided with wrench flats 14 and internally has at its rear end (rear is to the left) a short cylindrical bore 15 sized to have a close fit on the external hose wall. The front end of the socket is internally threaded at 16 to receive two other threaded parts and the section 18 between the threads and bore 15 is a conical bore with a taper of about 10° to the axis. In assembling the fitting, the first step is to slip the socket 12 over the hose end into the position shown in Fig. 2.

The next element of the fitting is the externally threaded sleeve, generally designated 20 in Fig. 2. Externally this sleeve has an outer tapered surface 21 which cooperates with the tapered section 18 of socket 12 to grip the wire braid. Internally it has a cylindrical bore 22 sized to fit on the outside of the hose tube 10. Two or more internal annular ribs 24 are provided and a shoulder 25 abuts the end of the hose tube 10 and at its front end the sleeve has a bell mouth 26 which is a sealing surface, as will be described, this surface being curved on a rather short radius.

In assembling the fitting the second step is to insert sleeve 20 between the end of tube 10 and the end of braid 11 until shoulder 25 abuts the end of the tube, as shown in Fig. 1. Heretofore this sleeve has been provided with a cylindrical outer surface from the front end of tapered surface 21 to the front end of the sleeve, which would be an extension of surface 28 as shown in Fig. 2 or like the sleeve 20a shown in Fig. 3, in which similar reference numbers indicate similar parts. In accordance with one aspect of the invention, this construction has been changed by the addition of the external threads 29, which are designed to screw into threads 16 of socket 12, and the addition of means at the front end of the sleeve for engagement by a tool by which the sleeve may be turned, shown in Figs. 1 and 2 as alined slots or apertures 30, into which a spanner or screwdriver can be inserted, cut into an upstanding rim 31. Obviously, a variety of other tool-engaging means may be used one other being hereinafter described.

The third element of the fitting is the nipple, generally designated 35, through which there is a cylindrical bore 36. Externally the nipple has a tube section 38 for insertion in the hose tube, a sealing surface 39 for engagement with surface 26 of the sleeve cut on a somewhat longer radius than the latter or in the form of an angular annular flat surface, a threaded section 40 to be screwed into socket 12 and a connector portion 41 with a standard 37° seat 42 and a locking wire groove 44 which cooperates with a mating groove 45 in swivel nut 46 to provide an annular space into which locking wire 48 can be driven through hole 49 in the nut in a well known manner. The nipple is appropriately cut away sufficiently between surface 39 and threaded section 40 to provide clearance for rim 31 of the sleeve as seen in Fig. 1 or to provide space for the threaded washer of Fig. 4 hereinafter described.

As above stated, the first step in assembling the foregoing structure is to push the hose end through socket 12 and the second is to push sleeve 20 between the tube and the braid of the hose into the position shown in Fig. 1. The next step, using an unthreaded sleeve like that shown in Fig. 3, has heretofore been to insert the tube section 38 of nipple 35 in the hose while holding socket 12 in a vise or the like and complete the assembly by tightening a standard adapter in nut 46 and against seat 42, applying a wrench to the adapter and thereby screwing the nipple into the socket. In thus assembling the fitting as heretofore made, the drawing together of the socket and nipple caused the end of braid 11 to be clamped between the tapered surfaces 18 and 21 only by reason of pressure through [seats] *seat* 39 of the nipple upon seat 26 on the sleeve. This slowly flattened the inherently resilient braid and no dead stop could be felt indicating when the fitting was tight. This clamping of the braid was all that held the fitting against blow-off because the tube 10 is not strongly gripped in this type of fitting. It should be noted that the compression of the hose by surface 15 against nipple wall 38 produces the seal against vacuum and low pressures. The high pressure seal is effected by the self-energizing lip seal of the end of tube 10 inside sleeve 20 in conjunction with the annular metal-to-metal seal between sleeve surface 26 and nipple surface 39.

In actual use such fittings have been found to be subject to frequent blow-offs. One reason for this is that the slightest backing off of the nipple from the sleeve not only breaks the metal-to-metal fluid seal 26, 39 but also and simultaneously loosens the metal-to-metal grip on the braid by surfaces 18 and 21 and nothing else holds the fitting on the hose against any substantial internal pressure. Such backing-off, due to relative rotation between socket 12 and nipple 35, may be caused by one or more of the following: (a) vibration in service, (b) accidental back-off by mechanics holding a wrench on the socket 12 while tightening swivel nuts at either end of the hose assembly, (c) a twist in the hose caused by careless assembly, and (d) temperature cycling. Another reason is that in tightening up this fitting, as heretofore constructed, there was no definite stopping point, there was no definite seating as between socket and nipple and one could not tell whether an apparent tightening was due to a proper assembly, a tight or a nicked thread or a socket distorted in the vise. In short, the assembler could not really know that the wire braid had actually been firmly gripped. Furthermore, the insertion of nipple 35 in the hose end after said end had been positioned inside the socket often forced the hose end outwardly of the socket without detection so that a proper grip could not be obtained.

The improvement, which resides in providing the sleeve with threaded holding means to engage with the threads in the socket by which it can be screwed or forced tightly into the socket, obviates these difficulties. In assembling the improved fitting the first two steps are the same, insertion of the hose end in the socket and insertion of the sleeve between the braid and the tube of the hose. However, before the nipple 35 is inserted, using the Fig. 2 structure, sleeve 20 is firmly seated in the socket 12 by holding either the socket or the sleeve and turning the other part until the braid is as firmly gripped as is possible. This connection becomes permanent. Moreover, since one may still, at this stage, see or probe inside the hose end, it can be determined that tube 10 is still seated against sleeve shoulder 25 which will indicate that the braid is fully inserted between the gripping surfaces 18 and 21, its end abutting shoulder 50 at the rear face of threaded section 29. The nipple is then screwed in as above described until its surface 39 seats against sleeve surface 26, thus making a fluid-tight, metal-to-metal seal at this point.

A very practical and unexpected advantage found to exist in this threaded sleeve construction is due to the fact that in the assembly the resilient wire braid is not being slowly crushed and clamped during the screwing in of nipple 35. That has already been done by separately screwing in the sleeve 20 under conditions permitting inspection of the position of the hose end. Hence, when the nipple is screwed in, the assembler can feel a dead stop upon the making of the metal-to-metal contact between sealing surface 39 on the nipple and the surface 26 on the already fully seated sleeve 20. The assembler then knows that by further tightening up after this dead stop is felt he really has a [prefectly] *perfectly* assembled fitting. Now, if any backing-off of the socket should take place for any reason, there may be leakage due to the breaking of the last mentioned seal but there will be no blow-off and consequent gross leakage because the grip on the braid will not be affected since the grip no longer depends on pressure exerted by the nipple.

An alternative construction involves the substitution for the threaded sleeve of Fig. 2 of the unthreaded sleeve 20a of Fig. 3 (the same as heretofore used) in conjunction with a separate threaded ring 51 shown in Fig. 4, or its equivalent. Obviously, nipple 35 will be provided with a larger annular recess to make room for ring 51 in the assembled fitting, as shown in Fig. 5 on nipple 35a. The ring 51 has threads 52 which mate with threads 16 in socket 12a, *a* suitably sized bore so that its rear face 54 bears on the outer peripheral front face of [nipple] *sleeve* 20a and tool-engaging slots 55 or the like by means of which it can be tightly screwed into the socket. With the hose inserted through the socket as shown in Fig. 2, sleeve 20a is inserted between tube

10 and braid 11 of the hose, the hose end is drawn into the socket to clear one or more threads and ring 51 is screwed in against the sleeve until braid 11 has been securely gripped. This construction has all of the advantages described above in connection with the structure of Figs. 1 and 2 except that one extra part is required. It has a further advantage in that when ring 51 is tightened, sleeve 20a does not rotate relative to the socket or the braid and the hose is not twisted relative to either of these clamping parts, that is to say neither of the clamping surfaces **18*a* or 21*a*** rotates relative to the other.

Fig. 5 also illustrates other modifications which may advantageously be incorporated in the fitting. Socket 12a is provided at 60 with a bell mouth and the bore 15a adjacent thereto is of somewhat smaller diameter, relative to the hose size, than in Fig. 1. This facilitates assembly and also puts more pressure on the hose in the direction of nipple 35a and produces a more gradual change in the gripping pressure on the braid as it emerges from between surfaces 18a and 21a, which is of importance in protecting the hose from damage when subjected to rapid pressure impulses. Socket 12a is also provided with two or more annular grooves 61 into which the braid may be forced upon tightening of the sleeve 20a, the better to secure it in the fitting. Sleeve 20a is shown as having three annular ribs 24a instead of two as in Figs. 1 and 3. Similarly annular grooves are provided on nipple 35a near its end at 62.

Another advantage of the above described constructions is that by screwing both the sleeve 20 (or 20a through its ring 51) and the nipple into the socket 12 or 12a, a lock nut effect is obtained which renders the fitting much more secure against accidental or unintentional relative turning between the socket and the nipple. It is thus much more vibration proof and less subject to loosening by reason of temperature cycling. This principle may be carried one step further, as illustrated in Fig. 5, by increasing the length of the thread 40 on nipple 35a to provide room for a lock-nut 65 which can be tightened against the forward face of socket 12a when assembly has been otherwise completed. This improvement can obviously be used in the absence of the other improvements already described, to prevent relative movement between the socket and nipple tending to loosen the fitting.

Figure 6:
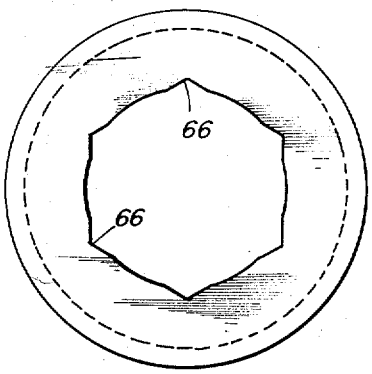
Fig. 6 is an end elevation of a threaded member showing an internal tool-receiving configuration.

Fig. 6 illustrates an alternate means for enabling a sleeve such as 20 or a threaded ring such as 51 to be seated in the socket by means of a tool. The end elevation may be taken as showing either of these members. The inner surface is broached to provide six indentations 66 which will receive a standard Allen wrench and the member is thereafter hardened. Thus a readily available tool may be used for securely seating the member.

The invention thus provides a much more secure fitting, one which is easier to install correctly and the installation of which can more readily be checked.

It is to be understood that the above-described specific embodiments are merely illustrative of the invention which is defined in the appended claims and which is not limited to all of the details of construction shown, many of which are subject to modification without departure from the spirit of the invention.

What is claimed is:

1. A fitting of the detachable reusable type for use on the end of a hose having a tube and a wire braid covering thereon, said fitting comprising a socket with an internally threaded section and an internal conical gripping surface adapted to surround said braid, a sleeve having an external conical gripping surface for cooperating in spaced relationship with said internal gripping surface and adapted to be positioned between the ends of said tube and said braid, threaded means adapted to be screwed into the threaded section of said socket for moving said sleeve into said socket into said spaced relationship for gripping the end of the braid between said conical gripping surfaces, said threaded section of the socket being constructed to extend beyond said threaded means when the sleeve is assembled to the socket, and a nipple; said nipple comprising an end adapted for insertion in said tube end, an annular seat for engagement with an annular surface of said sleeve, and an externally threaded portion adapted to screw into the extended threaded section of said socket, the arrangement being such that said nipple and said threaded means operate independently upon said sleeve to preclude relative movement between the sleeve and the socket after assembly of the fitting thereby securing the fitting against blow-off.

2. The fitting of claim 1 wherein said threaded means comprises an integral threaded section of said sleeve near the larger diameter end of the external gripping surface thereof, whereby said threaded [section] *portion* of the [sleeve] *nipple* and said threaded means develop mutually restraining locking forces with respect to the internally threaded section of the socket.

3. The fitting of claim 1 wherein said threaded means is an externally threaded ring adapted to bear against the end of said sleeve.

4. The fitting of claim 1 wherein said conical gripping surfaces have substantially the same degree of angularity relative to the fitting axis.

5. The fitting of claim 2 wherein the threaded section of the socket is adjacent its conical gripping surface and the threaded section of the sleeve forms a shoulder extending radially outwardly to form thereby an end closure for the space between said conical gripping surfaces.

6. The fitting of claim 1 wherein said threaded means is provided with tool-engaging means for enabling it to be screwed into said socket.

References Cited in the file of this patent or the original patent

UNITED STATES PATENTS

| | | |
|---|---|---|
| 874,543 | Scheuer | Dec. 24, 1907 |
| 1,819,243 | Hubbard | Aug. 18, 1931 |
| 2,490,686 | Guarnschelli | Dec. 6, 1949 |
| 2,497,986 | Goode | Feb. 21, 1950 |
| 2,731,279 | Main | Jan. 17, 1956 |

FOREIGN PATENTS

| | | |
|---|---|---|
| 714,874 | France | Sept. 14, 1931 |
| 782,512 | France | Mar. 18, 1931 |
| 151,318 | Australia | May 7, 1953 |
| 737,564 | Great Britain | Sept. 28, 1955 |